United States Patent
Brown (10) Patent No.: US 10,685,111 B2
(45) Date of Patent: Jun. 16, 2020

(54) FILE-MODIFYING MALWARE DETECTION

(71) Applicant: CrowdStrike, Inc., Irvine, CA (US)

(72) Inventor: Daniel W. Brown, Beverly, MA (US)

(73) Assignee: CrowdStrike, Inc., Irvine, CA (US)

( * ) Notice: Subject to any disclaimer, the term of this patent is extended or adjusted under 35 U.S.C. 154(b) by 161 days.

(21) Appl. No.: 15/339,844

(22) Filed: Oct. 31, 2016

(65) Prior Publication Data

US 2018/0121650 A1    May 3, 2018

(51) Int. Cl.
*G06F 21/00* (2013.01)
*G06F 21/56* (2013.01)

(52) U.S. Cl.
CPC .......... *G06F 21/565* (2013.01); *G06F 21/561* (2013.01); *G06F 21/566* (2013.01); *G06F 21/568* (2013.01); *G06F 2221/034* (2013.01)

(58) Field of Classification Search
CPC ........ G06F 21/55; G06F 21/554; G06F 21/56; G06F 21/566; G06F 21/568; G06F 2221/034; G06F 21/565
See application file for complete search history.

(56) References Cited

U.S. PATENT DOCUMENTS

| | | | | |
|---|---|---|---|---|
| 8,621,233 B1* | 12/2013 | Manadhata | ............. | G06F 21/56 709/224 |
| 9,317,686 B1* | 4/2016 | Ye | ........................ | G06F 11/1461 |
| 2009/0089878 A1* | 4/2009 | Monastyrsky | ........ | G06F 21/566 726/22 |
| 2010/0115614 A1 | 5/2010 | Barile et al. | | |
| 2014/0208427 A1* | 7/2014 | Grier | ................... | H04L 63/1416 726/23 |
| 2015/0281267 A1* | 10/2015 | Danahy | ............... | H04L 63/1416 726/23 |

FOREIGN PATENT DOCUMENTS

EP       3038003       6/2016

OTHER PUBLICATIONS

The Extended European Search Report dated Jan. 29, 2018 for European patent application No. 17198823.1, 7 pages.

* cited by examiner

*Primary Examiner* — Yogesh Paliwal (74) *Attorney, Agent, or Firm* — Lee & Hayes, P.C.

(57) ABSTRACT

A security agent implemented on a computing device is described herein. The security agent is configured to detect file-modifying malware by detecting that a process is traversing a directory of the memory of the computing device and detecting that the process is accessing files in the memory according to specified file access patterns. The security agent can also be configured to correlate actions of multiple processes that correspond to a specified file access pattern and detect that one or more of the multiple processes are malware by correlating their behavior.

20 Claims, 5 Drawing Sheets

FILE-MODIFYING MALWARE DETECTION

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, rootkits, and ransomware. Some of the threats posed by malware are of such significance that they are described as cyber terrorism or industrial espionage.

To counter these threats, governments, enterprises, and individuals use a range of security applications and services. Typically, these applications and services scan a device for a signature of certain malware. Responsive to finding the signature, the applications and services quarantine or delete the malware. The applications and services often miss more sophisticated security exploits, however, and often the applications and services are not configured to detect malware or take any actions until malware has gained a substantial foothold on a device or caused irreversible damage.

For example, one genus of malware seeks to modify files for a variety of reasons. This genus can include wipers and ransomware, which share some behavioral similarities but are purposed differently. Wipers are designed to destroy data on a device through any of a number of different methods. Some wipers write over portions of data files to make the data files unusable to an unsophisticated user. Other more seriously damaging wipers write over data and may do so multiple times using random sequences of data in order to make recovery of any data more difficult or impossible.

Another family of file-modifying malware can include some forms of ransomware that hold data hostage in exchange for a ransom of some kind. Often, this form of ransomware encrypts a portion of a computer's memory and notifies the user that the user will be provided with a way to decrypt the memory in exchange for payment. Once the files have been encrypted, there is usually very little to nothing even an advanced user can do to recover the encrypted data. Malware of this nature are of great concern for corporations, government entities, or other entities that store valuable or unproduceable data and they have become prevalent because of their lucrative nature.

Due to their scalability and the similar behaviors that these forms of code exhibit to normal computer operations, these malware can compromise data before current measures are able to detect the presence of the malware. This failure to act early enough in the malware's attempt to effect crippling modifications to data can result in substantial damage, loss, or difficulty in reversing the modifications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for detecting file-modifying malware. In some examples, the techniques discussed herein can be implemented on and/or for a computing device and can include determining that a process is a malware designed, at least in part, to maliciously modify files. In some examples, the techniques include detecting that a process executing on a computing device is traversing the directory of a file system of a memory of the computing device or accessible by the computing device. For example, the process could traverse a directory by repeatedly changing the current working directory associated with the process. Benign processes that may conduct directory traversals could include, for example, a process of an uninfected word processing application that is traversing the directory pursuant to an "Open File" or a "Save As" operation or an uninfected multimedia application that is searching throughout the directory for data files of a certain file type located (e.g., data files having a file extension such as, ".mp3" or ".mpeg4").

The techniques can further include detecting that the process ("first process") or another process associated with the first process ("second process") is accessing a file according to a particular file access pattern. For example, the techniques can include monitoring the first process and/or any processes associated with the first process (e.g., processes that the first process calls, processes called by a same parent process that called the first process) after detecting that the first process is traversing the directory and comparing actions taken by the first process or any associated processes to a plurality of definitions of file access patterns, where a definition of a file access pattern includes a specified set of process actions conducted on one or more files (e.g., making a copy of the file, reading from the file and encrypting the read content into the copy, renaming the file). In some examples, a definition of a file access pattern (or, as alternatively referenced to herein, a "defined file access pattern," "file access pattern definition," "DAP") can include a probability or quantification of confidence that the file access pattern is malignant and/or a probability that the file access pattern is malignant when the file access pattern is conducted by the first process and/or the second process.

For example, a first DAP outlining a first set of process actions could also indicate that a process that is traversing the directory and commits actions corresponding to the first set of process actions has a high likelihood of being malware, whereas if the process commits actions corresponding to actions specified by a second DAP, the second DAP may indicate that more information is needed or that there is a low confidence that the process is malware. In some examples, the techniques can include determining that a process is malicious upon detecting that the process is traversing the directory and that the process exhibits a file access pattern that accords with a particular DAP (e.g., an DAP that indicates that a process would rarely or never be benign when the process is traversing the directory and behaving according to DAP). In some examples, the techniques can further include an exception list of processes which traverse the directory and exhibit behavior according to the particular DAP.

In some examples, the techniques can also include monitoring and/or recording actions of the first process and/or one or more processes associated with the first process. In some examples, the techniques can include correlating actions of multiple processes and/or correlating multiple actions taken by a process in order to determine whether the process is malware or not. For example, for some DAPs that include a low confidence that a process is malware if the process is traversing the directory and accessing a file according to one of the DAPs, the techniques can include compiling a record of further behavior conducted by the first process or processes related to the first process that accords with one or more of the DAPs (e.g., where the DAPs are designed based on deconstruction of or observation of malware).

The techniques can include determining from the record that one or more of the processes is malware (e.g., by detecting that a first process is traversing the directory and by determining that the first process and/or associated processes commit actions that is identified as according with one or more DAPs a defined number of times, until a confidence metric reaches a threshold confidence value, the confidence metric being aggregated from respective probabilities defined by the identified DAPs and/or other information defined by the DAPs).

In some examples, the techniques discussed herein can configure a security agent, such as, for example, the "Kernel-Level Security Agent" described in greater detail in U.S. Pat. No. 9,043,903 and filed on Jun. 8, 2012, to determine that a process executing on a computing device is file-modifying malware and, in some examples, to take preventative actions regarding the process (e.g., stopping or preventing the process from running, reversing actions taken by the process, communicating information regarding the process to other computing devices to immunize the other computing devices from the process). In some examples, the techniques discussed herein can monitor a process, detect process actions, and/or receive event information as described by U.S. Pat. No. 9,043,903 and/or as described by U.S. patent application Ser. No. 15/213,004, titled "Inferential Exploit Attempt Detection" and filed on Jul. 18, 2016.

The techniques discussed herein overcome multiple problems with current measures that attempt to detect file-modifying malware and realize several distinct advantages that improve the security of a computing device without introducing cost-prohibitive processing or memory requirements. For example, current measures attempt to detect file-modifying malware by periodically calculating an entropy of a memory of a computing device and monitoring for a change in the entropy that may indicate that malware is wiping or encrypting data files, since encrypted data tends to be higher in entropy and data wiped according to some schemes may be higher in entropy. However, this does not overcome several problems that make such an analysis unsuitable for detecting the existence of a wiper or ransomware.

Firstly, it is possible to encrypt or modify data files in a manner that does not modify entropy so current measures would not detect malware using those methods or would not detect that malware until substantial amounts of data had been compromised. Secondly, some wipers and ransomware do not wipe or encrypt the entire file; they might encrypt just enough of a file to make it un-openable by an unsophisticated user. This method also does not alter the entropy of the memory enough to be detectable. Thirdly, many benign applications such as word processors, for example, or any application that allows use of encryption for data storage may increase the entropy, thereby introducing a high risk of false positives. Fourthly, calculating entropy across an entire file system is computationally expensive and therefore causes degradation of performance of computing devices that conduct such a calculation. Attempts to minimize this degradation include only performing an entropy calculation for small portions of the file system, which may ultimately lead to failing completely to detect malignant file-modification or failing to detect such modification before a substantial amount of data is compromised.

The techniques described herein detect that a process is file-modifying malware before a substantive number of files are compromised and/or, for some file access patterns, before any files are irreversibly altered. The configuration of the techniques also enable such detection without introducing high computational expense or limiting the scope of the detection to save on computational load, as current measures do. The configuration of the techniques as described herein accomplishes these advantages. In some examples, the techniques configure a computing device to stop or prevent execution of a process determined to be malware without requesting user authorization, halting any further destruction or alteration of data perpetuated by the malware, which can often be accomplished to a critical extent before a user would ever have a chance to investigate.

As used herein, an "associated process" is a second process associated with a first by some relationship of execution. In some examples, this relationship can be a parent/child relationship where the first process ("parent") called or otherwise initiated the second process ("associated," child). For example, the parent process can call an intermediary process (another associated process) which can subsequently cause initiation of any number of processes, ultimately causing initiation of the child process. In some examples, this relationship is that the first process and the second process are each child processes of a same parent process.

This description generally pertains to analyzing actions of processes and determining whether a process is malicious. However, it is understood that the described techniques herein can be modified to be applied to one or more of any function, module, process, or thread executing on a computing device. Moreover, as used herein a "malicious process" or determining that a process is "malicious" means that some code associated with the process is malicious. In some examples, a neutral process such as "cmd.exe," or other similar neutral processes, may run a script or are otherwise configured by some instructions to conduct malicious acts. Therefore, the term "malicious process" and determining that a process is "malicious" is referring to the process, script, code, or other instructions that are causing the malicious actions, directly or indirectly through directing an otherwise neutral or "safe" program to conduct the malicious actions. As used herein, the term "malware" therefore refers to the process, script, code, or other instructions that consist cause such malicious actions directly or indirectly.

As used herein, the terms "file" and "data file" are used interchangeably to mean a defined unit of data stored by a computer. Examples of files/data files can include text files, binary, instructions, etc. In some examples and in some computing environments, files/data files are assigned file extensions such as, for example, ".pdf," ".exe," ".dll," ".doc," ".mp3," ".html," ".dmp," etc.

As used herein, a "directory" is a file system structure of a memory of a device. Many directories are hierarchical and their structure can be used to reference particular locations in memory/data files (i.e., this reference is sometimes called a "path"). Partitions of memory can be structured according to different directories. In a Windows® operating system, for example, a root directory path (i.e., the first or top-most directory in a hierarchy) is referred to as "C:\" or "D:\" or "E:\", for example. In that example, a default Windows® operating system includes sub-directories that branch in the hierarchy from the root directory, "C:\". These branches can include files (e.g., "C:\Users\file.doc) and/or sub-directories ("C:\Users"). In many operating systems, files and sub-directories are differentiated by the manner they are referenced. Files names are followed by a file extension defining the type of file they are (e.g., "file.doc" or "C:\Users\Documents\file.doc"), whereas hierarchies do not include a file extension (e.g., "C:\Users\Documents," where "Documents" is a child directory of "Users" which is a child directory of the root directory, "C:").

As used herein, "traversing" a directory refers to navigating through the structure of a directory (e.g., moving through a directory tree in some examples where the directory is structured as a tree-like hierarchy), in some manner. For example, to reach a location where Windows® users commonly store document data files, a user might, in one example, use a window of an instance of the process "explorer.exe" to traverse the directory from the root directory "C:\" to "C:\Users," to "C:\Users\Documents", where the user hopes to locate a document file. In some examples, this can include changing a directory of a process; opening proximate, subsequent, and/or disparate locations in the directory; or otherwise moving through locations in the directory. Further examples of directory traversal are discussed herein.

Example Operation

Figure 1:
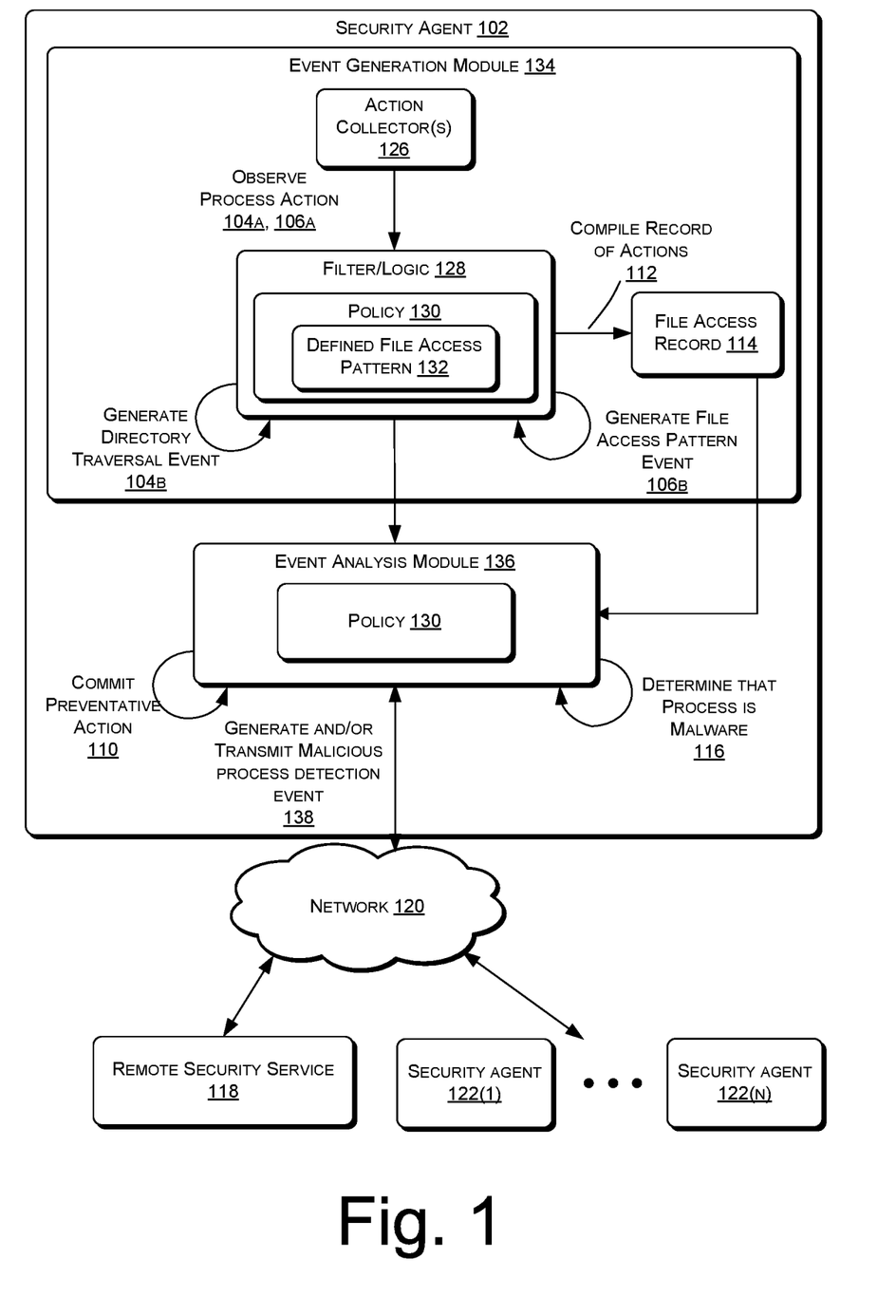
FIG. 1 illustrates an example overview of a security agent implemented on a computing device and actions taken by the security agent to detect file-modifying malware.

FIG. 1 illustrates an example overview of an example security agent 102 implemented on a monitored computing device and a configuration of the security agent to determine that one or more processes being executed on the monitored computing device is file-modifying malware.

In some examples, the security agent 102 can include various components to perform operations including one or more of: detecting (104a and 104b, collectively 104) that a process executed by a processor of the monitored computing device is conducting a traversal of a directory of a memory of the computing device; detecting (106a and 106b, collectively 106) that the process and/or another process associated with the process is accessing one or more files according to a defined file access pattern 132 ("DAP"); or committing (110) a preventative action against the process based at least in part on the detecting 104 and/or the detecting 106.

In some examples, the security agent 102 can include various components to perform additional or alternative operations such as one or more of: (112) compiling a record of actions 114 on one or more files committed by the process and/or process(es) associated with the process (e.g., process information related to the detecting 104 and/or the detecting 106, the record including a number of unique files accessed, a number of unique file types accessed (e.g., as determined by an extension of the file and/or the contents of the file), a number of times a file is accessed, a number of DAPs that match actions of the process and/or process(es) associated with the process, data recorded by the first process or the second process, locations in the directory to which the first process has navigated, a confidence metric determined from the record), and (116) determine based at least in part one or more of the detecting 104, the detecting 106, and/or the record of actions 114.

As illustrated in FIG. 1, a security agent 102 can be configured by, and communicate with, a remote security service 118 over a network 120. In some examples, the security agent 102 and/or the remote security service 118 can communicate via the network 120 with other security agent(s) 122(1)-(n) of other computing device(s). In some examples, the remote security service 118 can disseminate information related to a malicious process detected by the security agent 102 to security agent(s) 122(1)-(n) that are implemented on computing devices of a same network, company, and/or that share similar characteristics (e.g., same or similar operating system). In some examples, the remote security service 118 can disseminate information related to a malicious process to all the security agent(s) 108 with which the remote security service 104 is associated, regardless of network, company, or characteristics of the devices upon which the security agent(s) 108 are stored.

An example security agent 102 is described in greater detail in U.S. Pat. No. 9,043,903, entitled "Kernel-Level Security Agent" and filed on Jun. 8, 2012. The security agent 102 can include, for example, action collector(s) 126, a filter/logic 128, policy 130, defined file access pattern 132, event generation module 134, and/or event analysis module 136.

In various implementations, the computing device implementing the security agent 102 (referred to herein interchangeably as the "computing device" and the "monitored computing device") and the device(s) of the remote security service 118 and/or the device(s) storing the security agent(s) 122(1)-(n) may be connected by network 120. Network 120 may include any one or more networks, such as wired networks, wireless networks, and combinations of wired and wireless networks. Further, network 120 may include any one or combination of multiple different types of public or private networks (e.g., cable networks, the Internet, wireless networks, etc.). In some instances, computing devices communicate over the network 106 using a secure protocol (e.g., https) and/or any other protocol or set of protocols, such as the transmission control protocol/Internet protocol (TCP/IP).

Figure 5:
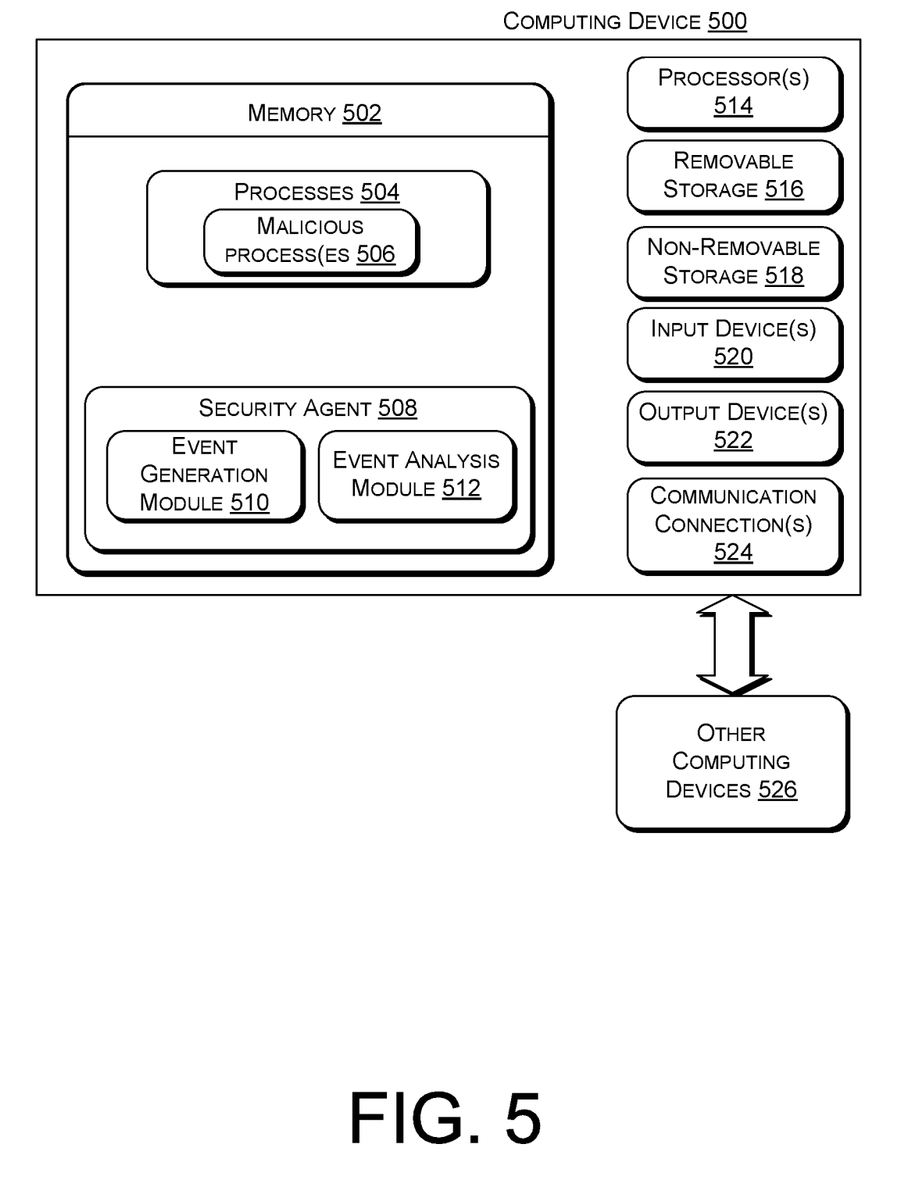
FIG. 5 illustrates a component level view of a monitored computing device configured with a security agent.

The computing device implementing the security agent 102 and the device(s) of the remote security service 118 may each be or include a server or server farm, multiple, distributed server farms, a mainframe, a work station, a personal computer (PC), a laptop computer, a tablet computer, a personal digital assistant (PDA), a smartphone, a wearable computing device, a smart vehicle, a cellular phone, a media center, an embedded system, or any other sort of device or devices. In one implementation, the device(s) of the remote security service 104 represent a plurality of computing devices working in communication, such as a cloud computing network of nodes. In some implementations, one or more of the computing device implementing the security agent 102 and the device(s) of the remote security service 118 represent one or more virtual machines implemented on one or more computing devices. An example computing device capable of serving as the computing device implementing the security agent 102 is illustrated in FIG. 5 and is described below with reference to that figure.

In various implementations, remote security service 118 may provide security service(s) to the computing device implementing the security agent 102 and to any number of other computing devices implementing other instances of the security agent 102. The remote security service 118 may receive notifications of interesting events from security agent 102, including file-modifying malware detection event notifications, as well as forensic data associated therewith. The remote security service 118 may determine if related notifications have been received from other security agent(s) 122(1)-(*n*) and/or evaluate the interesting event(s) based on one or more rules or heuristics.

The remote security service 118 may further perform any or all of generating an event and providing the event to the security agent 102 (e.g., for diagnostic, preventative, or healing purposes), generating a configuration update of the security agent 102, generating an update to the policy 130, healing the computing device implementing the security agent 102, deceiving an adversary associated with malicious code, or notifying entities or persons associated with the computing device implementing the security agent 102 of the potential malicious code. Upon generating a configuration update or an updated policy 112, the remote security service 118 may provide the configuration update or the updated policy 112 to the security agent 102 for implementation.

In some implementations, the security agent 102 may be any sort of security agent, such as a security agent implemented at the kernel-level. The security agent 102 may be installed by and configurable by the remote security service 118, receiving, and applying while live, reconfigurations of components of the security agent 102. Such reconfigurations may cause updates to any component(s) of the security agent 102, such as action collector(s) 126, filter/logic 128, policy 130, defined file access pattern 132, and/or event analysis module 134, in some examples. The security agent 102 may perform at least one of monitoring events on the computing device implementing that security agent 102, maintaining state about some or all of the events on that computing device, notifying the remote security service 118 of one or more events on the computing device, or taking action responsive to a malicious process associated with one or more events on the computing device.

In some examples, the action collector(s) 126 observe all sorts of actions (e.g., states, processor executions, data flow), including actions associated with processes. To receive the actions, the action collector(s) 126 may register with hooks or filters to receive notifications of the occurrence or non-occurrence of certain actions associated with processes or activities of interest. Action collector(s) 126 may also monitor locations in memory or log files, or spawn a thread to do so, observing actions associated with the log files or memory locations. Action collector(s) 126 may observe multiple kinds of actions, or each type of action may be associated with a different individual action collector 108. The events observed by the action collector(s) 126 may be specified by a configuration of the security agent 102.

The action collector(s) 126 can route observed process actions (104*a* and/or 106*a*) to the filter/logic 128. These observed actions can include, for example the creation (calling/initiating) or execution of processes and other actions by processes, which may be referred to herein as an observed process action (104*a* and/or 106*a*). If an observed process action 104*a* and/or 106*a* qualifies as an action of interest ("AoI") according to the policy 130 and/or a defined file access pattern 132, as discussed below, the filter/logic 128 can generate a process observation event (104*b* and/or 106*b*) in response to identifying that an observed process action 104*a* and/or 106*a* is an AoI, and/or it can concatenate the generated observation event(s) to a file access record 114.

In some examples, the event generation module 134 can generate and/or transmit observation event(s) 104*b* and/or 106*b* and/or the file access record 114. In some examples, the event analysis module 136 can determine from one or more of the detection event(s) 104*a* and/or 106*a* and/or the file access record 114 that a process associated with one or more of the events is malware and generate and/or transmit a malicious process detection event (138). In some examples, the event analysis module 136 or some other module of the security agent 102 can commit preventative actions 110 (e.g., stopping or preventing execution of the process, stopping or preventing execution of a process associated with the process, stopping or preventing an input/output operation associated with the process, stopping or preventing network operations associated with the process, recording information associated with the process, communicating the information associated with the process to one or more computing devices, or causing a computing device associated with the processor that executed the process to reboot).

In some examples, the events 104*a*, 106*b*, and/or 138 and other observed events/event notifications may be routed via an event bus, which may form part of the filter/logic 128 or be a separate component. The event bus may route events/event notifications between the components of the security agent 102.

In some examples, the filter/logic 128 receives an observed action (104*a* and/or 106*a*) (e.g., via an event notification) indicating an action committed by a process executed by the computing device) monitored by action collector(s) 108.

The filter/logic 128 can generate event notifications such as observation event(s) 104*b* and/or 106*b* if the process action originates from a process of interest (PoI) or is an action of interest (AoI) as specified by the policy 130. In some examples, the activities of interest may include those that enable file-modifying malware to gain a foothold on the computing device and/or to modify files of the computing device. Example OoIs may include, for example, processes for encrypting data, processes for deleting data, Internet browser plug-in threads (e.g., Flash threads), embedded macros, email application threads. In some examples for detecting file-modifying malware, a policy 130 can specify that an action is an AoI if the action includes one or more of:

- Traversing a directory of a memory of the computing device;
- Accessing one or more files in a way that matched a defined file access pattern 132 ("DAP") (e.g., an example DAP can define a file access pattern including a process making a copy of a file and reading from the file and encrypting the read contents of the file into the copy of the file and an AoI defined by this DAP would be the actions specified by the DAP—copying a file and encrypting the contents of that file into a copy, in this example);
- Repetitions of either of the actions specified above; or
- Accessing a "canary" file (e.g., a dummy file created and placed by the security agent 102 to warn of malware because the user/other applications would have no use for or knowledge of the file).

In some examples, the actions discussed above may only be AoIs when certain a certain process (a PoI) commits them.

In some examples, the filter/logic 128 can generate a specific observation event 104*b* that is a directory traversal event 104*b* upon determining that an AoI (as recorded by the observed process action 104*a*) accords with a portion of the policy 130 specifying qualifications for directory traversal, and/or generate a file access pattern event 106*b* upon determining that an AoI (as recorded by the observed process action 106*a*) accords with a DAP 132.

In some examples, the qualifications of the policy 130 for generating a directory traversal event can include one or more of: changing a directory of a process (e.g., iteratively, systematically, repeatedly (i.e., some defined number greater than or equal to two)), detecting that the process is conducting an "open directory" operation repeatedly (e.g., whether the opened directories are sub-directories of a tree-like directory or multiple root directories), or otherwise navigating through a directory. For example, the qualifications can be designed to flag behavior that is consistent with either: a same process (1) that traverses through the directory and records the locations of data files encountered in each sub-directory and/or (2) traverses through the directory iteratively, systematically, or regularly (e.g., two or more times).

In some examples, the filter/logic 128 can generate the file access pattern event 106*b* utilizing similar exclusion and inclusion lists to determine whether a process is exhibiting behavior that accords with a DAP (e.g., enabling the filter/logic 128 to generate a file access pattern event 106*b* for a process even if the process isn't accessing ".dll" files, but is accessing ".pdf" files according to a DAP). In some examples, the filter/logic 128 does not include the exclusion or inclusion list in order to generate the file access pattern and the filter/logic 128 can generate a file access pattern event 106*b*, regardless of the type of file upon which the access is performed.

In some examples, the directory traversal event(s) 104*b* and/or the file access pattern event(s) 106*b* generated by filter/logic 110 can be provided to the event analysis module 136 in order to determine whether the AoI is being conducted by a malicious process (e.g., file-modifying malware) or a benign application. In some examples, the directory traversal event(s) 104*b* and/or the file access pattern event(s) 106*b* can include various information related to the observed process action. For example, the directory traversal event(s) 104*b* and/or the file access pattern event(s) 106*b* can specify an identifier of a process associated with the AoI (e.g., a process) and/or type of the process committing the AoI, target data (data that is requested to be analyzed and/or obtained by the event analysis module 136), etc. In some examples, the directory traversal event(s) 104*b* and/or the file access pattern event(s) 106*b* can include a confidence metric supplied from the policy 130 and/or determined by the event generation module 134 and/or the event analysis module 136, the confidence metric being an indication of whether the AoI with which the directory traversal event(s) 104*b* and/or the file access pattern event(s) 106*b* are associated is malignant or benign. In some examples, the confidence metric can be determined from multiple directory traversal events 104*b* and/or file access pattern events 106*b* and/or the file access record 114. For example, certain combinations of AoIs are rarely benign (i.e., the combination of actions is almost always a combination of actions taken by malware). A confidence metric assigned to those AoIs and/or that combination of AoIs may therefore be a high number.

In some examples, the event analysis module 136 can decrease a confidence metric that the AoI(s) are associated with a malicious process based at least in part on an inclusion list (i.e., a whitelist) of applications that often behave like file-modifying malware. Such applications can include, for example, applications for organizing and deleting data, word processing applications, encrypting applications, compression utilities, etc. In some examples, events generated for certain DAPs associated with low confidence metrics may be added to a file access record 114. For example, some file access patterns may be common to benign applications, even when a process is also conducting directory traversal. For example, a user could be directing a word-processing application to navigate for a particular directory and overwrite a file pursuant to a "Save As" function. The event generation module 134 could generate a first event upon detecting the directory traversal (104*b*) and generate a second event upon detecting behavior according with a DAP 132 (106*b*) defining overwriting a file as a DAP 132.

In some examples, the event analysis module 136 would determine from the first and second event that the confidence metric associated with the first and/or second event(s) is too low to commit any preventative actions. It could direct the event generation module 134 to record the events and monitor for further events by the process or associated processes that accord with the DAP 132 or another DAP 132. In some examples, the event generation module 134 can automatically record events for a process in a file access record 114 and provide the file access to the file access record 114 periodically, once an aggregated confidence metric reaches a threshold value, and/or at the request of the event analysis module 136.

In some examples, the confidence metric determined by the event generation module 134 and/or event analysis module 136 and/or specified by the policy 130, can be elevated if multiple AoIs are detected for one process and/or processes associated with the one process and/or if multiple AoIs of the one process and/or processes associated with the one process accord with one or more DAPs, and/or if multiple AoIs accord with multiple DAPs.

In some examples, the file access can record the file(s) with which the process associated with the AoI was interacting one or more of directory traversal event(s) 104*b* and/or the file access pattern event(s) 106*b*. For example, the event generation module 134 can record one or more of an identification of the file(s) (e.g., name, file extension, location in the directory—"explorer.exe" or "C:\Users\Username\Documents\Patent.doc" for example), an identification of the type of the file(s) (e.g., file extension), and/or a count of a number of files accessed and/or a number of the type of files accessed. In some examples the event generation module 134 can be configured to uniquely count any of this data, meaning the event generation module 134 could be configured to count accessing unique files instead of just copies of a certain file or repeatedly accessing a same file. In some examples, one or more of these counts can be used to increase or decrease the confidence metric (e.g., repeatedly accessing one file could decrease the confidence metric whereas a record reflecting a process and/or associated processes that is(are) accessing multiple files and/or or file types could increase the confidence metric).

In some examples, malware may employ exclusion lists that specify data files to not record or access (e.g., avoid files with extensions that, if modified, could crash the system before the malignant file modification is complete, such as ".sys," ".ocx," ".dll," ".exe") and/or inclusion lists (e.g., file name extensions to determine files containing user data such as ".pdf," ".jpeg," ".doc," ".docx," ".mp3"). Therefore, the file access record 114 can include information regarding the types of files accessed, which can be used to characterize detected malware (e.g., by characterizing the potential exceptions and/or inclusions a particular malicious process seems to behave according to).

In some examples, the event analysis module 136 can calculate a confidence score that a process is malicious based at least in part on one or more of the directory traversal event(s) 104b and/or the file access pattern event(s) 106b and/or the file access record 114. In that case, the event analysis module 136 can create a malicious process detection event 138 if a determined confidence metric exceeds a score threshold (e.g., the score threshold can be set by the remote security service 118 and/or the policy 130 in some examples). In additional or alternate examples, the event analysis module 136 can ascertain how well an observed process action 104a and/or 106 accords with directory traversal as specified by the policy 130 and/or a DAP § 132.

In some examples, responsive to generation of the malicious process detection event 138, the security agent 102, the event analysis module 136, and/or the remote security service 118 can commit preventative action 110. For example, the actor committing the preventative action can commit actions including one or more of labelling a process as malicious, characterizing and/or recording code associated with the process (e.g., creating a record of information related to AoIs committed by the malignant process, where the process was stored, identifiers of the process, a hash associated with the process), destroying a process or a portion of a process associated with the shell code, stopping or preventing execution of the AoI and/or a process related to the AoI, stopping or preventing an input/output operation, stopping or preventing a network operation, patching the vulnerability, and/or causing the computing device to reboot, among other measures. The security agent 102 can be configured to take preventative action automatically (i.e., without receiving and/or requesting user input). In some examples, the preventative action can include decrypting and/or restoring or recovering one or more files. For example, the security agent 102 can take preventative action when the confidence metric exceeds a threshold value and/or when the event analysis module 136 generates the malicious process detection event (which may be contemporaneous with the determination that the confidence metric exceeds a threshold value). In some examples, the security agent 102 can also configured to additionally notify a user that preventative action was taken and/or to seek user authorization before committing the preventative action.

In response to receiving a malicious process detection event 130, the remote security service 118 can update the policy 130 utilized by the filter/logic 128 and/or update the configuration of the security agent 102 and/or the security agent(s) 122(1)-(n). The remote security service 118 can also provide instructions or other updates to the security agent 102 and/or the security agent(s) 122(1)-(n) to diagnose, prevent, or heal based on the detected malicious process. In some examples, the remote security service 118 and/or the event generation module 136 can add to or modify the DAPs based at least in part on actions of and/or computing contexts of processes that committed the AoIs/triggered generation of the events.

Example Processes

Figure 2:
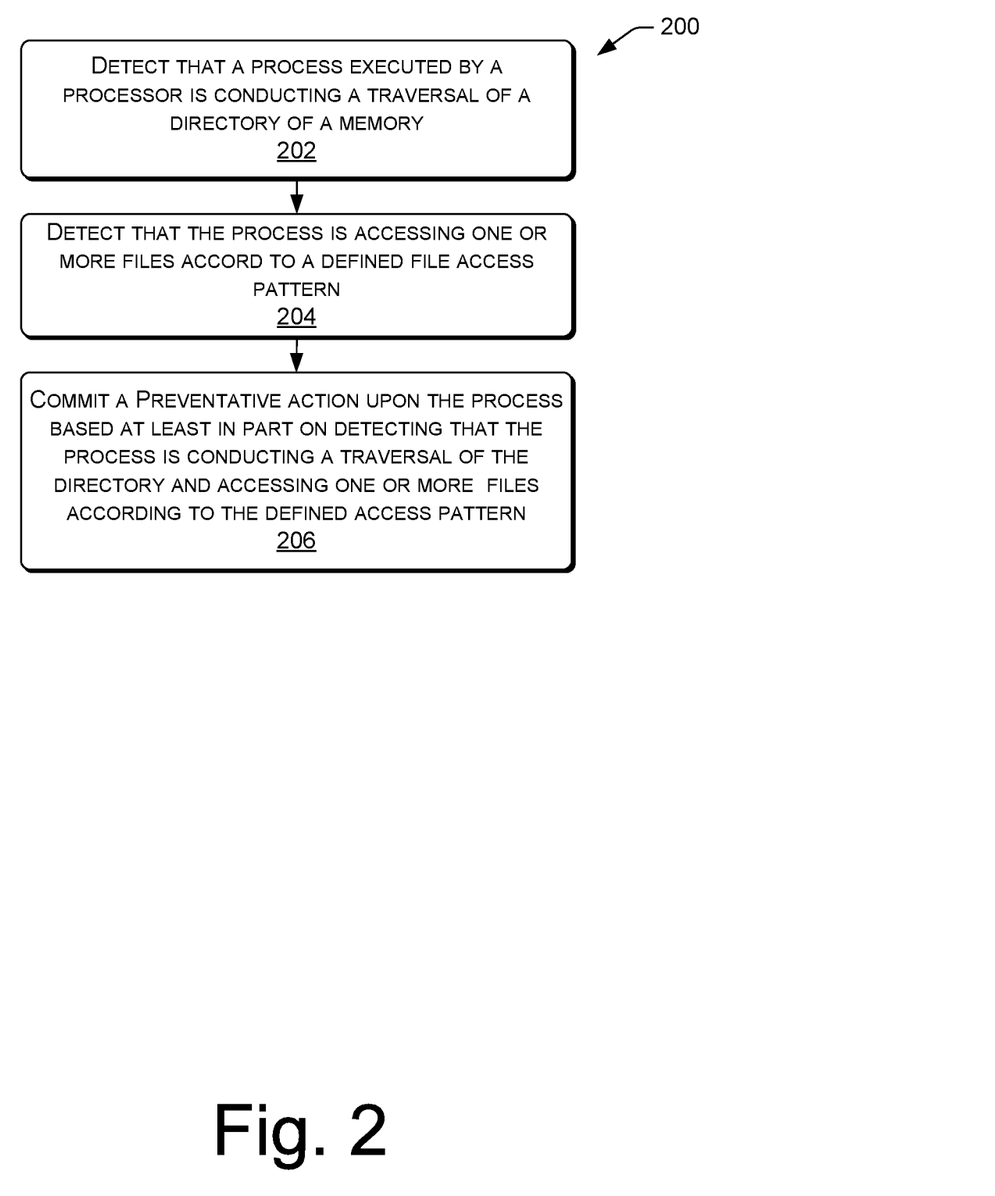
FIG. 2 illustrates an example process for detecting file-modifying malware and committing preventative action against the malware.
Figure 3:
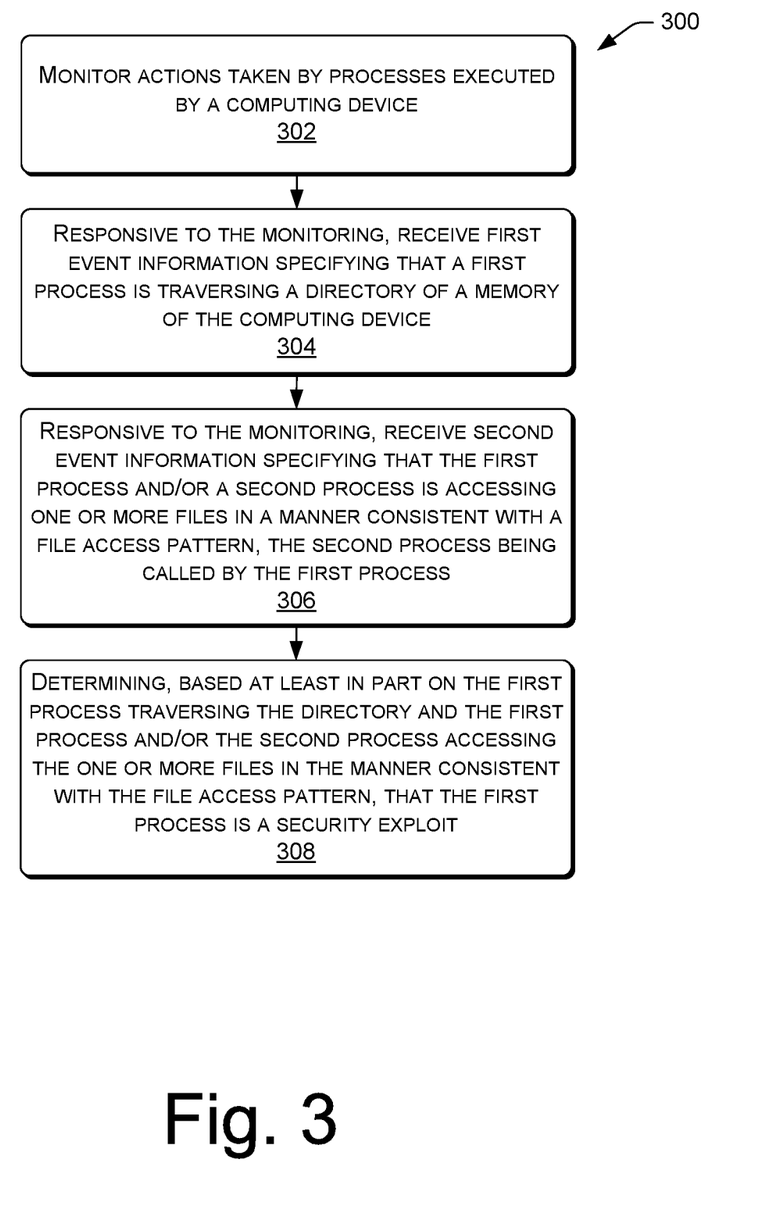
FIG. 3 illustrates an example process for detecting file-modifying malware.
Figure 4:
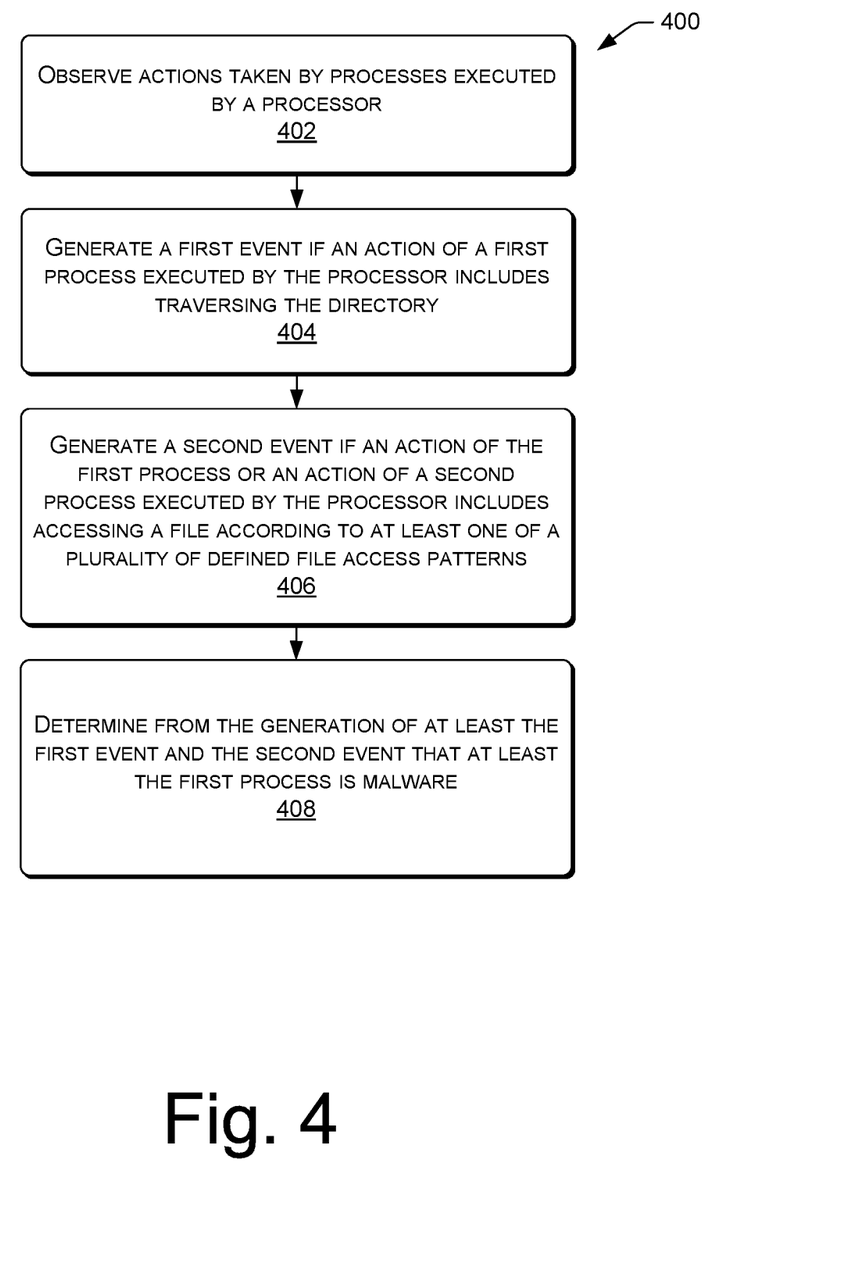
FIG. 4 illustrates an example process for detecting file-modifying malware.

FIGS. 2-4 illustrate example processes. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, processes, components, data structures, and the like that perform particular functions or implement particular abstract data types. The order in which the operations are described is not intended to be construed as a limitation, and any number of the described operations can be combined in any order and/or in parallel to implement the processes.

FIG. 2 illustrates an example process 200 for detecting file-modifying malware on a computing device and committing a preventative action against the file-modifying malware.

The process 200 can include, at 202, detecting that a process executed by a processor is conducting a traversal of a directory of a memory. In some examples, such detecting can be conducted by the security agent 102 per the discussion above, using action collector(s) 126, filter/logic 128, and/or policy 130. In some examples, detecting describes observing a process action at 104a and generating a directory traversal event at 104b. In some examples, the process could, at this point, begin a file access record for the process, to which further detected events regarding that process or any process associated with that process could be concatenated. Any other method of detecting that a process is traversing a directory of a memory can be employed, however.

At 204, in some examples, the security agent 102, can detect that the process is accessing one or more files according to a DAP. In some examples, this information can be added to a file access record for that process. In some examples, additionally or alternatively the security agent 102 can detect that an associated process (e.g., a process called by the process that is traversing the directory) accesses one or more files according to a DAP. In some examples information related to associated processes can be added to the file access record of the process detected to be traversing the directory. In some examples, the DAP is a definition of actions taken by a process (and/or one or more associated processes, e.g., a particular DAP might define three actions and the process might commit the first of the three actions specified by the DAP, an associated process might commit the second of the three actions specified by the DAP, and the process might commit the third of the three actions specified by the DAP). In some examples, the policy 130 can include multiple DAPs to which the security agent 102 compares actions of one or more processes. In some examples, the security agent 102 correlates actions of multiple processes to detect that two or more processes are accessing one or more files according to a DAP.

In some examples, operations 202 and 204 and the associated security agent are configured to detect that malware is traversing a directory, looking for particular data files (i.e., target files) (e.g., files having a particular extension and/or files not having a particular extension, as determined by an inclusion or exclusion list, respectively) and encrypting or otherwise modifying all the files it is looking for in each sub-hierarchy the malware uncovers. In some examples, operations 202 and 204 and the associated security agent are configured to detect that malware is traversing the directory recording the locations of target data to be encrypted or otherwise modified after the malware enumerates a sufficient number or all the locations of the target files before modifying the files.

In some examples, one example DAP could include "in-file" encryption/modification of a file. This DAP includes the actions of reading data from a file, encrypting/ modifying the read data, and writing the encrypted/modified data to the file being accessed. Further actions included in an "in-file" DAP can include writing to a header of the accessed file to indicate metadata of the file such as, for example, an original name of the file, etc.

In another example, another example DAP can include the actions of making a copy of an accessed file, reading data from the accessed file, and encrypting the read data into the copy of the accessed file. In some examples, this DAP can further include one or more of renaming the copied file to match the name of the accessed file (to overwrite the accessed file) or deleting the accessed file.

At 206, based at least in part on detecting that the process is traversing the directory and detecting that the process (and/or an associate process) are accessing one or more files according to a DAP, the security agent 102 can commit a preventative action upon the process (and/or upon the computing device, in some examples, such as restoring modified files). In some examples, operation 206 can include taking the preventative action automatically (i.e., without receiving and/or requesting user input). For example, the security agent 102 can commit the preventative action when the confidence metric exceeds a threshold value and/or when the event analysis module 136 generates the malicious process detection event (which may be contemporaneous with the determination that the confidence metric exceeds a threshold value). In some examples, the security agent 102 can also configured to additionally notify a user that preventative action was taken and/or to seek user authorization before committing the preventative action.

FIG. 3 illustrates an example process 300 for determining that a process is file-modifying malware.

The process 300 can include, at 302, per any of the techniques discussed herein, monitoring actions taken by processes executed by a computing device (e.g., by monitoring actions taken by a processor that are associated with particular processes). In some examples, the computing device has access to/includes one or more memories organized by a directory file system.

At 304, the process 300 can include receiving first event information (e.g., directory traversal event 104b) specifying that a first process is traversing a directory of a memory of the computing device, according to any of the techniques discussed herein.

At 306, the process 300 can include receiving second event information (e.g., file access pattern event 106b) specifying that a first process and/or a second process (e.g., an associated process) is accessing one or more files in a manner consistent with a DAP, per any of the techniques discussed herein. In some examples, this operation can be repeated multiple times for DAPs having a low associated confidence. In some examples, the process can wait until a determined confidence value exceeds a threshold before proceeding to 308.

For example, for certain DAPs, confidence that a process that is traversing the directory and exhibiting an instance of behavior that corresponds with a DAP is malignant might be low. In some examples, this process can further include recording a number of unique files accessed according to a DAP by the first process and/or the second process(es), a number of unique file types of files accessed according to a DAP by the first process and/or the second process(es), and/or other information, as discussed herein (e.g., data recorded by the first process and/or the second process, locations in the directory to which the first process has traversed, the confidence metric, accessed file-identifying information, disk entropy information).

In some examples, a subset of actions that accord with a DAP can be conducted by the first process and/or a subset of actions that accord with a DAP can be conducted by the second process(es). For example, the first process might traverse the directory to enumerate file locations and call instances of a second process to encrypt that files that the first process has found. In some examples, the first process might rename the files encrypted by instances of the second process to overwrite the original files. The process can therefore further include compiling a record of the first event information and/or the second event information.

At 308, the process 300 can include determining, based at least in part on the first process traversing the directory and the first process and/or the second process accessing the one or more files in the manner consistent with the file access pattern, that the first process is malicious, per any of the techniques discussed herein. In some examples, it is sufficient to determine from the reception of the first event information and reception of the second event information, that the first process is malicious.

In some examples, the determining can be based on correlating the first event information with multiple instances of second event information specified by the second event information. For example, at 308, a security agent 102 can determine that the first process is malicious after receiving second event information that specifies that the first process and/or the second process(es) are accessing, according to a DAP, files of multiple file types, a high number of files, files located in multiple locations in the directory, or files located in sequential locations in a hierarch disk. The determining at 308 can be further based on an exclusion or inclusion list that specifies applications that are benign that might exhibit this behavior. In some examples, the security agent 102 can determine that the second process(es) are also malicious and/or commit preventative actions towards them. In some examples, the second process(es) can be file deletion processes and/or encryption processes that are not inherently malignant. In some examples, the security agent 102 can stop the first process if the first process is the directory traverser and/or the second process(es) (e.g., the encrypting/modifying process(es)).

In some examples, the process can further include determining an entropy of at least a portion of the memory and, based at least in part on the entropy, determining a family of malware which characterize the first process (e.g., a wiper, ransomware). For example, wipers and/or ransomware can increase an entropy of memory at locations associated with modified files. This information can be included in information disseminated to the security service or other instances of the security agent.

FIG. 4 illustrates an example process 400 for determining that a process is file-modifying malware.

The process 400 can include, at 402, observing actions taken by processes executed by a processor of a computing device, per any of the techniques discussed herein.

At 404, the process 400 can include generating a first event (e.g., directory traversal event 104b) if an action taken by a process executed by the processor includes traversing a directory of a memory of the computing device, per any of the techniques discussed herein.

At 406, the process 400 can include generating a second event (e.g., file access pattern event 106b) if an action taken by a process and/or an associated process executed by the processor accessing a file according to at least one of a plurality of DAPs, per any of the techniques discussed herein.

At 408, the process 400 can include determining, based at least in part on the generating of the first event and/or the second event, that at least the first process is malware.

Example System

FIG. 5 illustrates a component level view of a computing device configured with processes that can include malware and a security agent. As illustrated, computing device 500 comprises a memory 502 storing processes 504 that may include malicious process(es) 506, and the security agent 508 that, in some examples, corresponds to the security agent 102 and that can include an event generation module 510 and an event analysis module 512, that in some examples correspond to the event generation module 134 and the event analysis module 136, respectively. Also, computing device 500 can include processor(s) 514, a removable storage 516 and non-removable storage 518, input device(s) 520, output device(s) 522, and communication connections 524 for communicating with other computing devices 526.

In various embodiments, memory 502 is volatile (such as RAM), non-volatile (such as ROM, flash memory, etc.) or some combination of the two. The processes 504 may be any sort of process, such as a function, process, or thread. In some examples, the memory 502, the removable storage 516, and/or the non-removable storage 518 have file systems structured as a directory (e.g., a hierarchical directory, a flat directory).

In some embodiments, the processor(s) 514 can a central processing unit (CPU), a graphics processing unit (GPU), field-programmable gate array (FPGA), and/or other processing unit or component known in the art. Computing device 500 can also include additional data storage devices (removable 516 and/or non-removable 518) such as, for example, magnetic disks, optical disks, or tape. In some examples, the removable storage 516 and/or the non-removable storage 518 can be more broadly described as the memory 502 or "computer-readable media." Non-transitory computer-readable media may include volatile and nonvolatile, removable and non-removable media implemented in any method or technology for storage of information, such as computer readable instructions, data structures, program modules, or other data. Memory 502, removable storage 516, and non-removable storage 518 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 500. Any such non-transitory computer-readable media may be part of the computing device 500. Therefore, computer-readable media, as used herein, should not be interpreted to include a signal or other such transmission medium.

Computing device 500 can also include input device(s) 520, such as, for example, a keyboard, a mouse, a touch-sensitive display, voice input device, etc., and/or output device(s) 326 such as, for example, a display, speakers, a printer, communications interface, etc. These devices are well known in the art and need not be discussed at length here.

Computing device 500 can also include communication connections 524 that allow the computing device 500 to communicate with other computing devices 526, such as devices of the remote security service 118.

Example Clauses

A. A system including: a processor; a memory, the memory being cataloged by a directory and the memory having stored thereon computer-executable instructions that, when executed by the processor, configure the system to perform operations including: detecting that a process executed by the processor is conducting a traversal of the directory; detecting that the process is accessing one or more files according to a defined file access pattern; and committing a preventative action upon the process based at least in part on detecting that the process is conducting a traversal of the directory and accessing one or more files according to the defined file access pattern.

B. A system as paragraph A recites, the operations further including: determining one or more of a number of distinct files, a number of distinct file types, or an identification of distinct file types that the process accesses according to the defined file access pattern; and compiling a file access record including one or more of the number of number of distinct files, the number of distinct file types, or the identification of the distinct file types accessed by the process according to the defined file access pattern.

C. A system as either paragraph A or B recites, the operations further including: determining from the file access record a likelihood that the file access record correlates with file access activity associated with a malicious process, the committing being further based at least in part on one or more of the file access record or the likelihood.

D. A system as any one of paragraphs A-C recites, the preventative action including one or more of: stopping or preventing execution of the process, stopping or preventing execution of a process associated with the process, stopping or preventing an input/output operation associated with the process, stopping or preventing network operations associated with the process, recording information associated with the process, communicating the information associated with the process to one or more computing devices, or causing a computing device associated with the processor that executed the process to reboot.

E. A system as any one of paragraphs A-D recites, the processor committing the preventative action without receiving input from a user.

F. A system as any one of paragraphs A-E recites, the process conducting the traversal of the directory being a first process and the process accessing the one or more files according to the defined file access pattern being a second process.

G. A system as any one of paragraphs A-F recites, the process conducting the traversal of the directory being a first process, the process accessing the one or more files according to the defined file access pattern being a second process, and the operations further including: determining that the first process initiated the second process or that the first process initiated at least one intermediary process that initiated the second process; and based at least in part on determining that the second process is accessing the one or more files according to the defined file access pattern, the committing the preventative action including stopping or preventing execution of the first process.

H. A system as any one of paragraphs A-G recites, the operations further including: determining one or more of a number of distinct files, a number of distinct file types, or an identification of distinct file types that one or more of the first process or the second process accesses according to the defined file access pattern; compiling a file access record including one or more of the number of number of distinct files, the number of distinct file types, the identification of the distinct file types accessed by one or more of the first process or the second process according to the defined file access pattern; and associating the first process and the second process in the file access record, the committing the preventative action being further based at least in part on the file access record.

I. A system any one of paragraphs A-H recites, the operations further including: detecting that the first process initiates one or more additional processes; associating the one or more additional processes with the first process in the file access record; determining whether any of the one or more additional processes accesses one or more files according to a defined file access pattern; and concatenating to the file access record information related to the one or more additional processes that accesses one or more files according to a defined file access pattern, the committing the preventative action being further based at least in part on the file access record including the information.

J. A computer-implemented method comprising: monitoring actions taken by processes executed by a computing device, the computing device including a memory organized by a file system comprising a directory; responsive to the monitoring, receiving first event information specifying that a first process is traversing the directory; responsive to the monitoring, receiving second event information specifying that the first process or a second process is accessing one or more files in a manner consistent with a file access pattern, the second process being called by the first process; determining, based at least in part on the first process traversing the directory and the first process or the second process accessing the one or more files in the manner, that the first process is a security exploit; and causing commitment of a preventative action towards the first process based at least on the determining.

K. A computer-implemented method as paragraph J recites, the file access pattern including one or more actions regarding a file that are consistent with an attempt by a malicious process to modify at least a portion of the file.

L. A computer-implemented method as either paragraph J or K recites, the one or more actions including one or more of wiping at least a portion of data of the file or encrypting at least a portion of the data of the file.

M. A computer-implemented method as any one of paragraphs J-L recites further including: determining an entropy of at least a portion of the memory; responsive to determining that the first process is a malicious process, determining, based at least in part on the entropy, a family of security exploits which characterizes the first process, the family including at least one of a wiper or ransomware; and disseminating information that includes characteristics of the first process or the second process to one or more computing devices, the information configuring the one or more computing devices to commit a preventative action against the first process.

N. A computing device including: a processor; a memory; a directory specifying a file system configuration for accessing the memory; a security agent configured to be executed on the computing device by the processor to at least detect execution of malware by the processor, the security agent comprising: an event generation module configured to: observe actions taken by processes executed by the processor; generate a first event if an action of a first process executed by the processor includes traversing the directory; generate a second event if an action of the first process or an action of a second process executed by the processor includes accessing a file according to at least one of a plurality of defined file access patterns, the second process being associated with the first process; and an event analysis module configured to: determine from the generation of at least the first event and the second event that at least the first process is malicious.

O. A computing device as paragraph N recites, the event generation module being further configured to: compile a record of one or more first events and one or more second events associated with one or more of the first process, the second process, or additional processes associated with the first process, and the event analysis module being configured to determine that the first process is malicious from the record.

P. A computing device as either paragraph N or O recites, the record including one or more of: a number of distinct files accessed by the first process or the second process according to at least one of the plurality of defined file access patterns, a number of times the first process or the second process access one or more files according to one of the plurality of defined file access patterns, a number of ones of the plurality of defined file access patterns that the event generation module detects as corresponding to actions of the first process or the second process, a record of distinct file types accessed by the first process or the second process according to at least one of the plurality of defined file access patterns, data recorded by the first process or the second process, or locations in the directory to which the first process has navigated; or a confidence metric determined from and aggregated over instances of any of the information contained in the record.

Q. A computing device as any one of paragraphs N-P recites, the event analysis module being further configured to use the record to: correlate one or more of the first events or the second events with benign activity or activity designed to compromise usability of data on the memory.

R. A computing device as any one of paragraphs N-Q recites, the security agent further comprising an exploit prevention module configured to: stop or prevent execution of one or more of the first process or the second process; compile a preventative record including one or more of characteristics or prior actions of one or more of the first process or the second process; and transmit the preventative record to a security agent of one or more other computing devices.

S. A computing device as any one of paragraphs N-R recites, the event generation module configured to generate the first event for the first process by: detecting that the first process is traversing the directory by one or more of: observing that the first process is iteratively changing a current directory of the first process, or observing that the first process is iteratively conducting an operation to open directories.

T. A computing device as any one of paragraphs N-S recites, the event generation module configured to generate the second event for the first process or the second process by: based upon generation of the first event, monitoring one or more of the first process or the second process to determine whether the first process or the second conducts actions regarding a data file defined by one of the plurality of defined file access patterns, the second process being called by the first process; detecting that the first process or the second process is conducting actions regarding a data file that matches at least one of the file access patterns; and generating the second event.

U. A system implementing the computer-implemented method of any one of paragraphs J-M.

V. Computer-readable media having stored thereon computer-executable instructions to accomplish the operations of any one of paragraphs J-M.

W. Means for accomplishing the operations of any one of paragraphs J-M.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system including:
    a processor; and
    a memory, the memory being cataloged by a directory and the memory having stored thereon computer-executable instructions that, when executed by the processor, configure the system to perform operations including:
        generating a directory traversal event based at least in part on detecting that a process executed by the processor is conducting a traversal of the directory by changing a current working directory of the process to navigate through a hierarchical structure of the directory, and that the process is enumerating locations of one or more user data files within the directory during the traversal;
        generating a file access pattern event based at least in part on detecting that the process is accessing at least one of the one or more user data files, according to a defined file access pattern associated with malicious activity, to encrypt or modify the at least one of the one or more user data files; and
        committing a preventative action upon the process in response to generating both the directory traversal event and the file access pattern event.

2. A system as claim 1 recites, the operations further including:
    determining one or more of a number of distinct user data files, a number of distinct user data file types, or an identification of distinct user data file types that the process accesses according to the defined file access pattern; and
    compiling a file access record including the one or more of the number of distinct user data files, the number of distinct user data file types, or the identification of the distinct user data file types that the process accesses according to the defined file access pattern.

3. A system as claim 2 recites, the operations further including:
    determining from the file access record a likelihood that the file access record correlates with file access activity associated with a malicious process,
    the committing being further based at least in part on one or more of the file access record or the likelihood.

4. A system as claim 1 recites, the preventative action including one or more of:
    stopping or preventing execution of the process,
    stopping or preventing execution of a second process associated with the process,
    stopping or preventing an input/output operation associated with the process,
    stopping or preventing network operations associated with the process,
    recording information associated with the process,
    communicating the information associated with the process to one or more computing devices, or
    causing a computing device associated with the processor that executed the process to reboot.

5. A system as claim 1 recites, the committing including:
    committing the preventative action without receiving input from a user.

6. A system as claim 1 recites, the process conducting the traversal of the directory being a first process and the process accessing the at least one of the one or more user data files according to the defined file access pattern being a second process.

7. A system as claim 1 recites, the process conducting the traversal of the directory being a first process, the process accessing the at least one of the one or more user data files according to the defined file access pattern being a second process, and the operations further including:
    determining that the first process initiated the second process or that the first process initiated at least one intermediary process that initiated the second process; and based at least in part on determining that the second process is accessing the at least one of the one or more user data files according to the defined file access pattern, the committing the preventative action including stopping or preventing execution of the first process.

8. A system as claim 7 recites, the operations further including:
determining one or more of a number of distinct user data files, a number of distinct user data file types, or an identification of distinct user data file types that one or more of the first process or the second process accesses according to the defined file access pattern;
compiling a file access record including the one or more of the number of distinct user data files, the number of distinct user data file types, the identification of the distinct user data file types that the one or more of the first process or the second process accesses according to the defined file access pattern; and
associating the first process and the second process in the file access record,
the committing the preventative action being further based at least in part on the file access record.

9. A system as claim 8 recites, the operations further including:
detecting that the first process initiates one or more additional processes;
associating the one or more additional processes with the first process in the file access record;
determining whether any of the one or more additional processes accesses the one or more user data files according to the defined file access pattern; and
concatenating, to the file access record, information related to the one or more additional processes that accesses the one or more user data files according to the defined file access pattern,
the committing the preventative action being further based at least in part on the file access record including the information.

10. The system as claim 1 recites, wherein the preventative action includes reversing one or more actions taken by the process on the one or more user data files.

11. A computer-implemented method comprising:
monitoring actions taken by processes executed by a computing device, the computing device including a memory organized by a file system comprising a directory;
responsive to the monitoring, receiving first event information specifying that a first process is traversing the directory by changing a current working directory of the first process to navigate through a hierarchical structure of the directory and that the first process or a second process is enumerating at least one location of one or more user data files within the directory during the traversing, the second process being called by the first process;
responsive to the monitoring, receiving second event information specifying that the first process or the second process is accessing the one or more user data files to encrypt or modify the one or more user data files in a manner consistent with a file access pattern associated with malicious activity;
determining, based at least in part on receiving both the first event information and the second event information, that the first process is a security exploit; and
causing commitment of a preventative action towards the first process based at least on the determining.

12. A computer-implemented method as claim 11 recites, the file access pattern including one or more actions regarding a user data file of the one or more user data files that are consistent with an attempt by a malicious process to encrypt or modify at least a portion of the user data file.

13. A computer-implemented method as claim 12 recites, the one or more actions including one or more of wiping at least a portion of data of the user data file or encrypting at least a portion of the data of the user data file.

14. A computer-implemented method as claim 11 recites, further including:
determining an entropy of at least a portion of the memory;
responsive to determining that the first process is the security exploit, determining, based at least in part on the entropy, a family of security exploits which characterizes the first process, the family including at least one of a wiper or ransomware; and
disseminating information that includes characteristics of the first process or the second process to one or more other computing devices, the information configuring the one or more other computing devices to commit an additional preventative action against the first process.

15. A computing device including:
a processor;
a memory;
a directory specifying a file system configuration for accessing the memory; and
a security agent configured to be executed on the computing device by the processor to at least detect execution of malware by the processor, the security agent comprising:
an event generation module configured to:
observe actions taken by processes executed by the processor;
generate a first event in response to detecting that a first process executed by the processor is traversing the directory by changing a current working directory of the first process to navigate through a hierarchical structure of the directory, and that the first process or a second process executed by the processor is enumerating at least one location of one or more user data files within the directory during the traversing, the second process being associated with the first process; and
generate a second event in response to detecting that the first process or the second process executed by the processor is accessing a user data file of the one or more user data files, according to at least one of a plurality of defined file access patterns associated with malicious activity, to encrypt or modify the user data file; and
an event analysis module configured to:
determine, based on the generation of both the first event and the second event, that at least the first process is malicious.

16. A computing device as claim 15 recites, the event generation module being further configured to:
compile a record of one or more first events, and one or more second events, associated with one or more of the first process, the second process, or additional processes associated with the first process, and
the event analysis module being configured to determine that the first process is malicious from the record.

17. A computing device as claim 16 recites, the record including one or more of:

a number of distinct user data files accessed by the first process or the second process according to the at least one of the plurality of defined file access patterns, a number of times the first process or the second process accesses one or more user data files according to one of the plurality of defined file access patterns, a number of ones of the plurality of defined file access patterns that the event generation module detects as corresponding to actions of the first process or the second process, a record of distinct file types accessed by the first process or the second process according to the at least one of the plurality of defined file access patterns, data recorded by the first process or the second process, locations in the directory to which the first process has navigated; or a confidence metric determined from and aggregated over instances of any information contained in the record.

18. A computing device as claim 16 recites, the event analysis module being further configured to use the record to: correlate the one or more of the first events, or the one or more of the second events, with benign activity or activity designed to compromise usability of data on the memory.

19. A computing device as claim 15 recites, the security agent further comprising an exploit prevention module configured to:

stop or prevent execution of one or more of the first process or the second process;

compile a preventative record including one or more of characteristics or prior actions of one or more of the first process or the second process; and transmit the preventative record to a security agent of one or more other computing devices.

20. A computing device as claim 15 recites, the event generation module configured to generate the second event for the first process or the second process by:

based upon the generation of the first event, monitoring one or more of the first process or the second process to determine whether the first process or the second conducts actions regarding a data file defined by one of the plurality of defined file access patterns, the second process being called by the first process;

detecting that the first process or the second process is conducting actions regarding a data file that match at least one of the plurality of defined file access patterns; and based on the detecting, generating the second event.

* * * * *